US009701772B2

(12) United States Patent
Resconi et al.

(10) Patent No.: US 9,701,772 B2
(45) Date of Patent: Jul. 11, 2017

(54) PROCESS FOR PREPARATION OF PROPYLENE COPOLYMER

(71) Applicant: BOREALIS AG, Vienna (AT)

(72) Inventors: Luigi Resconi, Ferrara (IT); Wilfried Töltsch, Marchtrenk (AT); Wang Jingbo, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/906,627

(22) PCT Filed: Jul. 22, 2014

(86) PCT No.: PCT/EP2014/065711
§ 371 (c)(1),
(2) Date: Jan. 21, 2016

(87) PCT Pub. No.: WO2015/011135
PCT Pub. Date: Jan. 29, 2015

(65) Prior Publication Data
US 2016/0176997 A1    Jun. 23, 2016

(30) Foreign Application Priority Data

Jul. 24, 2013  (EP) ..................................... 13177883

(51) Int. Cl.
| | | |
|---|---|---|
| C08F 210/16 | (2006.01) | |
| C08F 210/06 | (2006.01) | |
| C08F 2/12 | (2006.01) | |
| C08F 2/34 | (2006.01) | |
| C08F 4/643 | (2006.01) | |
| C08F 4/645 | (2006.01) | |
| C08F 4/659 | (2006.01) | |
| C08F 2/38 | (2006.01) | |

(52) U.S. Cl.
CPC ........ C08F 210/16 (2013.01); C08F 4/65908 (2013.01); C08F 4/65912 (2013.01); C08F 210/06 (2013.01); C08F 2410/01 (2013.01)

(58) Field of Classification Search
CPC .. C08F 2/14; C08F 2/34; C08F 4/6037; C08F 4/61922; C08F 210/06; C08F 2/001; C08F 4/65908; C08F 4/65912
USPC ...................... 525/53, 322; 526/65
See application file for complete search history.

(56) References Cited

U.S. PATENT DOCUMENTS

| | | | |
|---|---|---|---|
| 4,740,550 A | 4/1988 | Foster | |
| 7,816,452 B2 * | 10/2010 | Dahn ..................... | C08F 10/06 525/191 |
| 9,296,844 B2 * | 3/2016 | Reichelt .................. | C08L 23/14 |
| 2008/0081887 A1 | 4/2008 | Wang | |
| 2011/0294972 A1 | 12/2011 | Chevalier et al. | |

FOREIGN PATENT DOCUMENTS

| | | |
|---|---|---|
| CN | 100503659 C | 6/2009 |
| CN | 101889030 A | 11/2010 |
| EP | 0 574 258 A2 | 12/1993 |
| EP | 1 471 085 A1 | 10/2004 |
| EP | 2 722 346 A1 | 4/2014 |
| WO | 98/40418 A1 | 9/1998 |
| WO | 98/58975 A1 | 12/1998 |
| WO | 98/58976 A1 | 12/1998 |
| WO | 02/02576 A1 | 1/2002 |
| WO | 03/051934 A2 | 6/2003 |
| WO | 2004055069 A1 | 7/2004 |
| WO | 2006/069733 A1 | 7/2006 |
| WO | 2007/116034 A1 | 10/2007 |
| WO | 2009/054832 A1 | 4/2009 |
| WO | 2010/052260 A1 | 5/2010 |
| WO | 2010/052263 A1 | 5/2010 |
| WO | 2010/052264 A1 | 5/2010 |
| WO | 2010077230 A1 | 7/2010 |
| WO | 2011/076780 A1 | 6/2011 |

(Continued)

OTHER PUBLICATIONS

Wang et al., "Long chain branching in ethylene polymerization using constrained geometry metallocene catalyst", Macromolecular chemistry and physics., 1998, pp. 2409-2416, vol. 199, No. 11, cited in the Specification (9 pages).
Yano et al., "Propylene polymerization with Ph2C(3-RCp)(Flu)ZrCl2 [R=Me, i-Pr, PhCH2, Me3Si] catalysts activated with MAO and Me2PhNH B(C6F5)4/i-Bu3Al", Macromolecular chemistry and physics., 1999, pp. 2127-2135, vol. 200, No. 9, cited in the Specification (10 pages).
International Search Report dated Sep. 10, 2014, issued in counterpart International Application No. PCT/EP2014/065711 (4 pages).

*Primary Examiner* — Fred M Teskin
(74) *Attorney, Agent, or Firm* — Westerman, Hattori, Daniels & Adrian, LLP

(57) ABSTRACT

A process for the preparation of a propylene copolymer, preferably a heterophasic propylene copolymer, in a multi-stage polymerisation process in the presence of a single site catalyst, said process comprising: (I) in a slurry polymerisation step, polymerising propylene and optionally at least one C2-10 alpha olefin comonomer; and subsequently (II) in a gas polymerisation step polymerising propylene and optionally at least one C2-10 alpha olefin comonomer, in the presence of catalyst and polymer from step (I); (III) in a second gas polymerisation step, polymerising propylene and at least one C2-10 alpha olefin comonomer in the presence of the catalyst and polymer from step (II); wherein said catalyst comprises (i) a metallocene complex of a group (IV) metal, said metallocene comprising at least two cyclopentadienyl type ligands; (ii) a boron based cocatalyst; and (iii) an aluminoxane cocatalyst; said catalyst being in solid form, preferably in solid particulate form, and being free from an external carrier.

25 Claims, 2 Drawing Sheets

(56) References Cited

FOREIGN PATENT DOCUMENTS

| WO | 2011/135004 A2 | 11/2011 |
| WO | 2011/135005 A2 | 11/2011 |
| WO | 2012/001052 A2 | 1/2012 |
| WO | 2012/084961 A1 | 6/2012 |
| WO | 2013/007650 A1 | 1/2013 |
| WO | 2013/007664 A1 | 1/2013 |
| WO | 2014/060534 A1 | 4/2014 |
| WO | 2014/060540 A1 | 4/2014 |
| WO | 2014/060541 A1 | 4/2014 |

\* cited by examiner

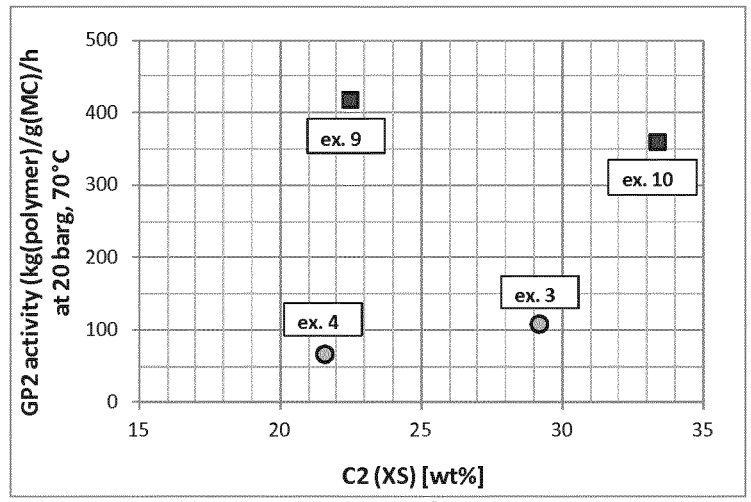
Figure 1: GP2 activity of Comp Cat 1 and 2 (●) and Cat 3 (■) at 20 bar-g, 70 °C
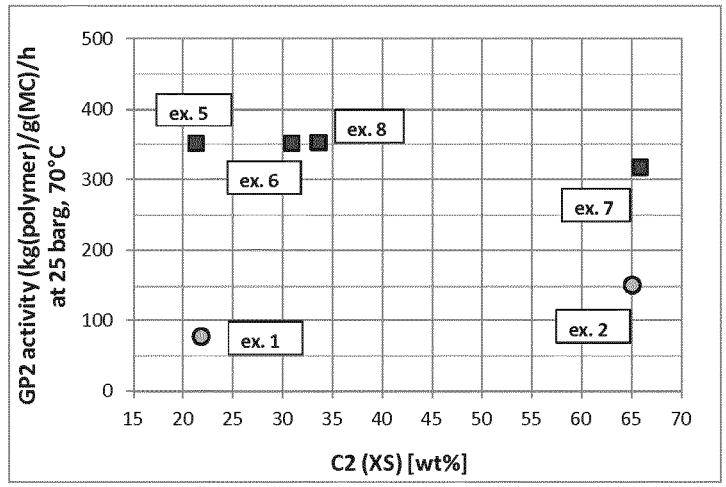
Figure 2: GP2 activity of Comp Cat 1(●) and Cat 3 (■) at 25 bar-g, 70 °C

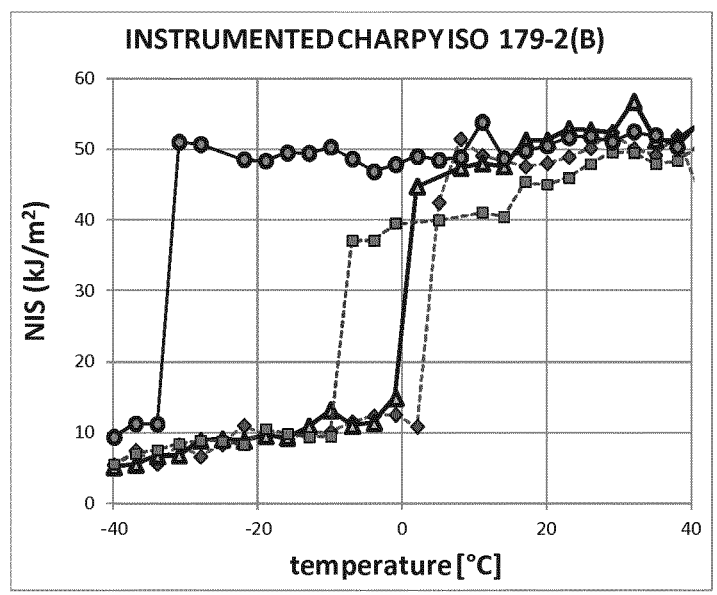
Figure 3: Instrumented Charpy curves for heterophasic materials prepared with Comp Cat 1 (-----) examples 2 (♦) and 3 (■) and its borate-modified analogue Cat 3 (———) examples 7 (▲) and 8 (●)

PROCESS FOR PREPARATION OF PROPYLENE COPOLYMER

The present invention relates to a process for producing a multimodal polypropylene copolymer using a single site catalyst in a multistage polymerisation process, especially a heterophasic propylene copolymer. In particular, the invention relates to a process where catalyst productivity and activity in the gas phase, and in particular in the second of two gas phase steps, is enhanced in a slurry bulk-gas phase-gas phase polymerisation cascade.

This is achieved through the use of a particular metallocene complex along with an aluminoxane and a boron based cocatalyst. The catalyst is in solid form but is free of an external carrier. This combination remarkably gives rise to catalysts which offer surprising properties in the context of a slurry bulk/gas phase/gas phase polymerisation.

BACKGROUND

Multistage polymerisation processes are well known and widely used in the art for polymerising polypropylene. Process configurations containing at least one slurry phase polymerisation reactor and at least one gas phase polymerisation reactor are disclosed e.g. in U.S. Pat. No. 4,740,550, and further e.g. in WO98/058975 and WO98/058976. A prepolymerisation reactor is often included in the process configuration, typically to maximise catalyst performance. The use of prepolymerisation also avoids overheating the catalyst particles. Prepolymerisation also helps to ensure a more even polymerisation on the catalyst particles reducing the probability of creating fines in later reaction steps.

Single site catalysts have been used to manufacture polyolefins for many years. Countless academic and patent publications describe the use of these catalysts in olefin polymerisation. One big group of single site catalysts are metallocenes, which are nowadays used industrially and polyethylenes and polypropylenes in particular are often produced using cyclopentadienyl based catalyst systems with different substitution patterns.

Single site catalysts are used in propylene polymerisation in order to achieve some desired polymer properties. However, there are some problems in using single site catalysts on industrial scale in multistage polymerisation configurations. Thus, there is room for improving the process and catalyst behaviour in the process.

In slurry and gas phase processes alike, catalysts need to be made of solid, uniform particles of appropriate particle size, morphology and mechanical stability to avoid reactor fouling, sheeting and line plugging.

The use therefore of a catalyst support is common place. Metallocenes are conventionally supported on a carrier such as silica. The use however of supported catalysts is associated with problems such as silica residues in the final product. Further, there is still room for improved activity, and improved polymer particle formation.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo-transition metal catalyst without using e.g. external porous carrier particles, such as silica, normally required in the art. Thus, problems relating to catalyst silica residues can be solved by this type of catalyst. Further, it could be seen that catalyst particles having improved morphology, will give, due to the replica effect, polymer particles having improved morphology as well.

Some multistage polymerisation utilise a slurry phase followed by a gas phase set up. One of the possible limitations of polymerization catalysts in general, and of metallocene-based catalysts in particular, is that when the catalyst has a high activity in slurry, e.g. bulk, the activity in gas phase is often low. This makes it difficult to achieve a low bulk-to-gas phase ratio of the produced material (the so-called bulk/GP split).

To be relevant for industrial polypropylene production, a single site catalyst must have good performance under all polymerisation conditions, in particular in conditions, where polymerisation temperature is at least 60° C., and in all actual polymerisation reactors of the multistage process including both liquid (ideally bulk slurry) and gas phase reactors. The present invention tries to address this issue.

Especially in industrial production of heterophasic copolymers in a three stage polymerisation a catalyst must have, inter alia, a long enough lifetime to have still acceptable activity in the third reactor, in which the rubber phase is produced. One of the possible limitations of polymerization catalysts in general, and of metallocene-based catalysts in particular, is that when the catalyst has a high activity in bulk and in the first gas phase (GPR1) reactors, the activity in the second gas phase reactor (GPR2) is often low, not allowing attainment of a high GPR2- to -bulk+GPR1 ratio of the produced material (the so-called rubber split). Here therefore, strong (initial) activity in the bulk step can lead to faster catalyst deactivation, in turn leading to a poorly active catalyst in the second gas phase reactor.

The present inventors have now found a new class of olefin polymerisation catalysts, which are able to solve the problems disclosed above. In particular, the invention combines the use of boron based and aluminoxane cocatalysts in solid catalysts not containing any external support material, essentially prepared using the basic principles of WO03/05194.

The invention provides a solid catalyst material, where no silica support material is used and which exhibits remarkable increase in activity in the gas phase in a slurry-gas phase-gas phase polymerisation cascade. This process also avoids any problems relating to the use of the conventionally supported catalysts, such as silica supported catalysts without prejudicing activity and productivity.

Whilst both boron based and aluminoxane cocatalysts are well known in the art, they are typically used as alternatives. However, it is also known to use boron activators together with aluminoxanes in some circumstances.

EP-A-0574258 discloses use of boron compounds together with aluminoxanes in single site catalysts. The catalysts are homogeneous, however, and they are used in homogeneous polymerisation where activity increase could be observed.

In J Macromol. Chem Phys, 199, 2409-2416 (1998), there is a disclosure of the use of constrained geometry metallocene type catalysts with both a methyl aluminoxane and trispentafluorophenyl boron activator. In the context of solution phase polyethylene polymerisation, the blend was found to increase catalyst activity.

In the literature, there are also other similar observations, that homogeneous catalyst activity (solution phase polymerisation) was improved by using boron modification, but when heterogeneous catalysis was tried, i.e. when catalysts were supported on silica, activity was lower than that achieved using MAO activators alone.

However, WO1998/040418 discloses that when specific types of boron-compounds, in particular alkyl or aryl boronic acids (RB(OR')$_2$) or cyclic boron compounds, boroxanes, are used with silica supported metallocene catalysts in combination with aluminoxanes, higher activity was seen for ethylene-butene polymerisation.

US2011294972 discloses the use of catalysts of specific transition metal complexes comprising mono-anionic, bidentate triazole ligands in combination with MAO and borate type activators supported on silica in ethylene-butene polymerisation.

The present inventors have surprisingly found that the use of both boron based cocatalysts, especially borates, and aluminoxane cocatalysts in combination in a solid, but unsupported, metallocene catalyst, allows the formation of a catalyst which address the issue of the slurry bulk to gas phase split in the context of a heterophasic propylene copolymer.

By using the modified catalysts of the present invention, a very high activity can be obtained even in the second gas phase step, much higher than the activity of the similar catalysts without borate modification. The advantage of having high activity in second gas phase is not only in the higher overall productivity of the process, but also in the achievable range of polymer properties: for example a higher gas phase split enables the production of polypropylenes with broader molecular weight distribution. In the context of a heterophasic propylene copolymer, the control of the gas phase split allows manipulation of the xylene soluble content of the polymer. Further, an increase in polymer melt temperature $T_m$ is achieved using the process of the invention.

SUMMARY OF INVENTION

Thus viewed from one aspect the invention provides a process for the preparation of a propylene copolymer, preferably a heterophasic propylene copolymer, in a multistage polymerisation process in the presence of a single site catalyst, said process comprising:

(I) in a slurry polymerisation step, polymerising propylene and optionally at least one C2-10 alpha olefin comonomer; and subsequently (II) in a gas polymerisation step polymerising propylene and optionally at least one C2-10 alpha olefin comonomer, in the presence of catalyst and polymer from step (I);

(III) in a second gas polymerisation step, polymerising propylene and at least one C2-10 alpha olefin comonomer in the presence of the catalyst and polymer from step (II);

wherein said catalyst comprises (i) a metallocene complex of a Group 4 (IV) metal, said metallocene comprising at least two cyclopentadienyl type ligands;

(ii) a boron based cocatalyst; and (iii) an aluminoxane cocatalyst;

said catalyst being in solid form, preferably in solid particulate form, and being free from an external carrier.

Preferably, step (I) is a slurry bulk step and the bulk-to-gas phase weight ratio of the produced material (bulk/GP split) is lower than 50:50, or even lower than 40:60. Ideal polymerisation temperatures are ≥70° C.

Viewed from another aspect the invention provides a process for the preparation of a propylene copolymer, preferably a heterophasic propylene copolymer in a multistage polymerisation process in the presence of a single site catalyst, said process comprising:

(Ia) prepolymerising a single site catalyst in the presence of propylene;

(Ib) in a slurry polymerisation step, polymerising propylene and optionally at least one C2-10 alpha olefin comonomer with the prepolymerised catalyst of step (Ia); and subsequently (II) in a gas polymerisation step polymerising propylene and optionally at least one C2-10 alpha olefin comonomer in the presence of catalyst and polymer from step (Ib);

(III) in a second gas polymerisation step, polymerising propylene and at least one C2-10 alpha olefin comonomer in the presence of the catalyst and polymer from step (II);

wherein said catalyst comprises (i) a metallocene complex of a Group 4 metal, said metallocene comprising at least two cyclopentadienyl type ligands;

(ii) a boron based cocatalyst; and (iii) an aluminoxane cocatalyst;

said catalyst being in solid form, preferably in solid particulate form, and being free from an external carrier.

Preferably the boron based cocatalysts are borate-type cocatalysts.

Ideally, the solid catalyst of the invention is obtainable by a process in which (a) a liquid/liquid emulsion system is formed, said liquid/liquid emulsion system comprising a solution of the catalyst components (i) to (iii) dispersed in a solvent so as to form dispersed droplets; and (b) solid particles are formed by solidifying said dispersed droplets.

Preferably, the process for obtaining the solid catalyst of the invention further involves a catalyst prepolymerisation step (c) ("off-line prepolymerisation") wherein the solid catalyst from step (b) is prepolymerised with at least one alpha-olefin monomer and optionally one or more $C_3$-$C_{10}$ alpha-olefin comonomers. Ideally this off-line prepolymerisation of the catalyst is effected using propylene.

Viewed from another aspect the invention provides a copolymer obtained by a process as hereinbefore defined.

DEFINITIONS

The catalysts of the invention are solid but do not contain an external carrier. By external carrier is meant a support such as silica or alumina on which a metallocene might be carried. The solid catalyst of the invention is designed for use in heterogeneous polymerisations. Catalysts in heterogeneous polymerisation stay essentially in solid form in the reaction medium under the polymerisation conditions.

The term polypropylene homopolymer refers to a polymer in which propylene forms the only monomer unit present.

Heterophasic propylene copolymers of this invention are copolymers, where the polymer contains a matrix component which is at least semi-crystalline and an amorphous component, i.e. a rubber component.

DETAILED DESCRIPTION OF THE INVENTION

Metallocene Complex

The invention can be effected with any metallocene complex of a Group 4 metal having at least two cyclopentadienyl type ligands.

The cyclopentadienyl type group ligand has been widely described in the scientific and patent literature for about fifty years. Essentially any ligand containing the general structure:

can be employed herein.

The cyclopentadienyl type ligand can be an unsubstituted or substituted and/or fused cyclopentadienyl ligand, e.g. substituted or unsubstituted cyclopentadienyl, substituted or unsubstituted indenyl, substituted or unsubstituted tetrahydroindenyl or substituted or unsubstituted fluorenyl ligand.

Suitable ligands therefore include:

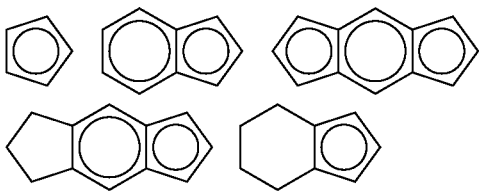

which can obviously be substituted. The use of indenyl ligands is preferred. The metallocene complex of the invention should not therefore comprise a single cyclopentadienyl type ligand. Preferably two such cyclopentadienyl type ligands are present, ideally joined by a bridging group. The substitution pattern on the two ligands may be the same or different. Metallocenes of use in this invention can therefore be symmetrical or asymmetrical.

The two cyclopentadienyl ligands of the present invention can be bridged or unbridged as is well known in the art. It is generally envisaged that the principles of this invention can be applied to any bis cyclopentadienyl type ligand system.

The metallocene complex will comprise at least one metal ion of Group 4 as is well known. This will be η-bonded to the cyclopentadienyl type rings. Such η-bonded metals are typically Zr, Hf or Ti, especially Zr or Hf.

In a preferred embodiment the metallocene complex is a compound of formula (I)

$$(Cp)_2R_nMX_2 \qquad (I)$$

wherein:

each Cp independently is an unsubstituted or substituted and/or fused cyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom to which they are attached;

R is a bridge of 1-3 atoms, e.g. a bridge of 1-2 C-atoms and 0-2 heteroatoms, wherein the heteroatom(s) can be e.g. Si, Ge and/or O atom(s), wherein each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^{10}_2$—, wherein each R$^{10}$ is independently C1-C20-alkyl, C3-12cycloalkyl, C6-C20-aryl or tri(C1-C20-alkyl)silyl- residue, such as trimethylsilyl;

M is a transition metal Group 4, e.g. Ti, Zr or Hf, especially Zr or Hf;

each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R$^1$ can further be substituted e.g. with C1-C20-alkyl which may contain Si and/or O atoms;

n is 1 or 2.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, each X is halogen, methyl, phenyl or —CH$_2$—Y, and each Y is independently as defined above.

Cp is preferably cyclopentadienyl, indenyl, tetrahydroindenyl or fluorenyl, optionally substituted as defined above. Ideally Cp is a cyclopentadienyl or indenyl.

In a suitable subgroup of the compounds of formula (I), each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, is preferably a methylene, ethylene or a silyl bridge, whereby the silyl can be substituted as defined above, e.g. a (dimethyl)Si=, (methylphenyl)Si=, (methylcyclohexyl)silyl= or (trimethylsilylmethyl)Si=; n is 0 or 1. Preferably, R" is other than hydrogen.

A specific subgroup includes the well known metallocenes of Zr, Hf and Ti with two eta5-ligands which are bridged cyclopentadienyl ligands optionally substituted with e.g. siloxy, or alkyl (e.g. C1-6-alkyl) as defined above, or with two bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

In a more preferred embodiment, the metallocene of use in the invention is

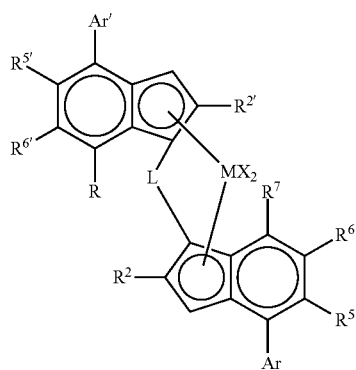

(II)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^5$ and $R^{5'}$ are each independently hydrogen, $C_{1-20}$ hydrocarbyl group optionally containing one or more heteroatoms from groups 14-16 and optionally substituted by one or more halo atoms;

$R^6$ and $R^{6'}$ are each independently hydrogen or a $C_{1-20}$ hydrocarbyl group optionally containing one or more heteroatoms from groups 14-16; or $R^5$ and $R^6$ taken together can form a 5 or 6 membered saturated or unsaturated carbon ring fused to the 6-membered ring of the indenyl group; or $R^{5'}$ and $R^{6'}$ taken together can form a 5 or 6 membered saturated or unsaturated carbon ring fused to the 6-membered ring of the indenyl group;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and each $R^4$ is a $C_{1-20}$ hydrocarbyl group.

More preferably, the complex of use in the invention is of formula (III)

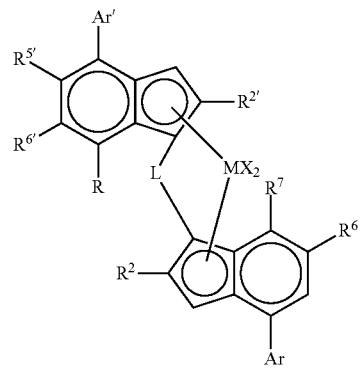

(III)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—R'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group optionally containing one or more heteroatoms from groups 14-16 and optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and each $R^4$ is a $C_{1-20}$ hydrocarbyl group.

The complexes of the invention are preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

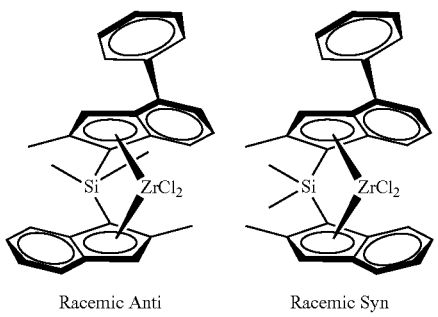

Racemic Anti          Racemic Syn

Formula (III) is intended to cover both syn and anti configurations, preferably anti. It is required in addition in compounds of formula (III), that the group $R^{5'}$ is not hydrogen where the 5-position in the other ligand carries a hydrogen.

In fact, the metallocenes of the invention are ideally $C_1$-symmetric but they maintain a pseudo-$C_2$-symmetry since they maintain $C_2$-symmetry in close proximity of the metal center, although not at the ligand periphery. As will be seen, the use of two different indenyl ligands as described in this invention allows for a much finer structural variation, hence a more precise tuning of the catalyst performance, compared to the typical $C_2$-symmetric catalysts. By nature of their chemistry, both anti and syn enantiomer pairs are formed during the synthesis of the complexes. However, by using the ligands of this invention, separation of the preferred anti isomers from the syn isomers is straightforward.

It is preferred if the metallocenes of the invention are employed as the rac anti isomer. Ideally therefore at least 95% mol, such as at least 98% mol, especially at least 99% mol of the metallocene is in the racemic anti isomeric form.

In the catalysts of the invention:

M is preferably Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, $C_{1-20}$ alkyl, $C_{2-20}$ alkenyl, $C_{2-20}$ alkynyl, $C_{6-20}$ aryl, $C_{7-20}$ alkylaryl or $C_{7-20}$ arylalkyl radical; optionally containing heteroatoms belonging to groups 14-16. R is preferably a $C_{1-6}$ alkyl, phenyl or benzyl group.

Most preferably each X is independently a hydrogen atom, a halogen atom, $C_{1-6}$ alkoxy group or an R group, e.g. preferably a $C_{1-6}$ alkyl, phenyl or benzyl group. Most preferably X is chlorine or a methyl radical. Preferably both X groups are the same.

L is preferably an alkylene linker or a bridge comprising a heteroatom, such as silicon or germanium, e.g. —$SiR^8_2$—, wherein each $R^8$ is independently $C_{1-20}$ alkyl, $C_{3-10}$ cycloakyl, $C_{6-20}$ aryl or tri($C_{1-20}$ alkyl)silyl, such as trimethylsilyl. More preferably $R^8$ is $C_{1-6}$ alkyl, especially methyl or $C_{3-7}$ cycloalkyl, such as cyclohexyl. Most preferably, L is a dimethylsilyl or a methylcyclohexylsilyl bridge (i.e. Me-Si-cyclohexyl). It may also be an ethylene bridge.

$R^2$ and $R^{2'}$ can be different but they are preferably the same. $R^2$ and $R^{2'}$ are preferably a $C_{1-10}$ hydrocarbyl group such as $C_{1-6}$ hydrocarbyl group. More preferably it is a linear or branched $C_{1-10}$ alkyl group. More preferably it is a linear or branched $C_{1-6}$ alkyl group, especially linear $C_{1-6}$ alkyl group such as methyl or ethyl.

The $R^2$ and $R^{2'}$ groups can be interrupted by one or more heteroatoms, such as 1 or 2 heteroatoms, e.g. one heteroatom, selected from groups 14 to 16 of the periodic table. Such a heteroatom is preferably O, N or S, especially O. More preferably however the $R^2$ and $R^{2'}$ groups are free from heteroatoms. Most especially $R^2$ and $R^{2'}$ are methyl, especially both methyl.

The two Ar groups Ar and Ar' can be the same or different. It is preferred however if the Ar groups are different. The Ar' group may be unsubstituted. The Ar' is preferably a phenyl based group optionally substituted by groups $R^1$, especially an unsubstituted phenyl group.

The Ar group is preferably a $C_{6-20}$ aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups $R^1$, more preferably by one or two $R^1$ groups, especially in position 4 of the aryl ring bound to the indenyl ligand or in the 3, 5-positions.

In one embodiment both Ar and Ar' are unsubstituted. In another embodiment Ar' is unsubstituted and Ar is substituted by one or two groups $R^1$.

$R^1$ is preferably a $C_{1-20}$ hydrocarbyl group, such as a $C_{1-20}$ alkyl group. $R^1$ groups can be the same or different, preferably the same. More preferably, $R^1$ is a $C_{2-10}$ alkyl group such as a $C_{3-8}$ alkyl group. Highly preferred groups are tert butyl or isopropyl groups. It is preferred if the group $R^1$ is bulky, i.e. is branched. Branching might be alpha or beta to the ring. Branched $C_{3-8}$ alkyl groups are also favoured therefore.

In a further embodiment, two $R^1$ groups on adjacent carbon atoms taken together can form a fused 5 or 6 membered non aromatic ring with the Ar group, said ring being itself optionally substituted with one or more groups $R^4$. Such a ring might form a tetrahydroindenyl group with the Ar ring or a tetrahydronaphthyl group.

If an $R^4$ group is present, there is preferably only 1 such group. It is preferably a $C_{1-10}$ alkyl group.

It is preferred if there is one or two $R^1$ groups present on the Ar group. Where there is one $R^1$ group present, the group is preferably para to the indenyl ring (4-position). Where two $R^1$ groups are present these are preferably at the 3 and 5 positions.

$R^5$ is preferably H.

$R^{5'}$ is preferably a $C_{1-20}$ hydrocarbyl group containing one or more heteroatoms from groups 14-16 and optionally substituted by one or more halo atoms or $R^{5'}$ is a $C_{1-10}$ alkyl group, such as methyl but most preferably it is a group $Z'R^{3'}$.

$R^6$ and $R^{6'}$ may be the same or different. In one preferred embodiment one of $R^6$ and $R^{6'}$ is hydrogen, especially $R^6$. It is preferred if $R^6$ and $R^{6'}$ are not both hydrogen. If not hydrogen, it is preferred if each $R^6$ and $R^{6'}$ is preferably a $C_{1-20}$ hydrocarbyl group, such as a $C_{1-20}$ alkyl group or $C_{6-10}$ aryl group. More preferably, $R^6$ and $R^{6'}$ are a $C_{2-10}$ alkyl group such as $C_{3-8}$ alkyl group. Highly preferred groups are tert-butyl groups. It is preferred if $R^6$ and $R^{6'}$ are bulky, i.e. are branched. Branching might be alpha or beta to the ring. Branched $C_{3-8}$ alkyl groups are also favoured therefore.

In a further embodiment, $R^5$ and $R^6$ taken together form a 5 membered carbon ring with the atoms to which they are attached.

In a further embodiment, $R^{5'}$ and $R^{6'}$ taken together form a 5 membered carbon ring with the atoms to which they are attached.

The $R^7$ and $R^{7'}$ groups can be the same or different. Each $R^7$ and $R^{7'}$ group is preferably hydrogen, a $C_{1-6}$ alkyl group or is a group $ZR^3$. It is preferred if $R^{7'}$ is hydrogen. It is preferred if $R^7$ is hydrogen, $C_{1-6}$ alkyl or $ZR^3$. The combination of both $R^7$ and $R^{7'}$ being hydrogen is most preferred.

It is also preferred if $ZR^3$ represents $OC_{1-6}$ alkyl, such as methoxy. It is also preferred is $R^7$ represents $C_{1-6}$ alkyl such as methyl.

Z and Z' are O or S, preferably O.

$R^3$ is preferably a $C_{1-10}$ hydrocarbyl group, especially a $C_{1-10}$ alkyl group, or aryl group optionally substituted by one or more halo groups. Most especially $R^3$ is a $C_{1-6}$ alkyl group, such as a linear $C_{1-6}$ alkyl group, e.g. methyl or ethyl $R^{3'}$ is preferably a $C_{1-10}$ hydrocarbyl group, especially a $C_{1-10}$ alkyl group, or aryl group optionally substituted by one or more halo groups. Most especially $R^{3'}$ is a $C_{1-6}$ alkyl group, such as a linear $C_{1-6}$ alkyl group, e.g. methyl or ethyl or it is a phenyl based radical optionally substituted with one or more halo groups such as Ph or $C_6F_5$.

Thus, preferred complexes of the invention are of formula (IV') or (IV)

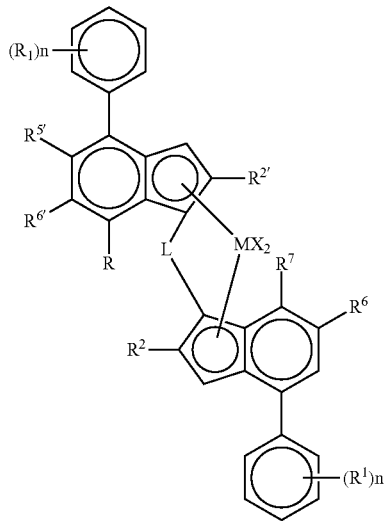

(IV')

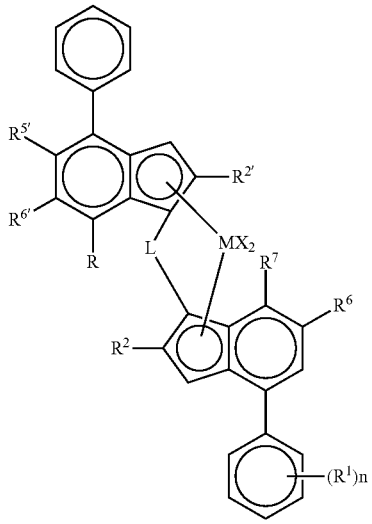

(IV)

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;
$R^{5'}$ is a $C_{1-10}$ alkyl group or $Z'R^{3'}$ group;
$R^6$ is hydrogen or a $C_{1-10}$ alkyl group;
$R^{6'}$ is a $C_{1-10}$ alkyl group or $C_{6-10}$ aryl group;
$R^7$ is hydrogen, a $C_{1-6}$ alkyl group or $ZR^3$ group;
$R^{7'}$ is hydrogen or a $C_{1-10}$ alkyl group;
Z and Z' are independently O or S;
$R^{3'}$ is a $C_{1-10}$ alkyl group, or a $C_{6-10}$ aryl group optionally substituted by one or more halo groups;
$R^3$ is a $C_{1-10}$-alkyl group;
each n is independently 0 to 4, e.g. 0, 1 or 2;
and each $R^1$ is independently a $C_{1-20}$ hydrocarbyl group, e.g. $C_{1-10}$ alkyl group.

More preferably, complexes of use in the invention are those of formula (V') or (V):

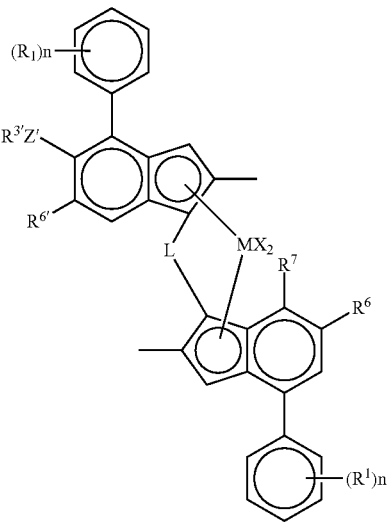

(V')

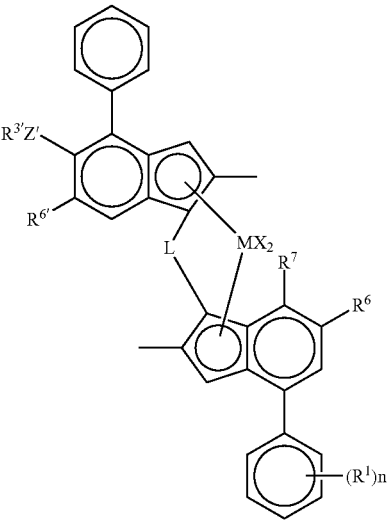

(V)

M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, C$_{1-20}$ alkyl or C$_{3-10}$ cycloalkyl;

R$^6$ is hydrogen or a C$_{1-10}$ alkyl group;

R$^{6'}$ is a C$_{1-10}$ alkyl group or C$_{6-10}$ aryl group;

R$^7$ is hydrogen, C$_{1-6}$ alkyl or OC$_{1-6}$ alkyl;

Z' is O or S;

R$^{3'}$ is a C$_{1-10}$ alkyl group, or C$_{6-10}$ aryl group optionally substituted by one or more halo groups;

n is independently 0 to 4, e.g. 0, 1 or 2; and each R$^1$ is independently a C$_{1-10}$ alkyl group.

More preferably, complexes of use in the invention are those of formula (VI') or (VI):

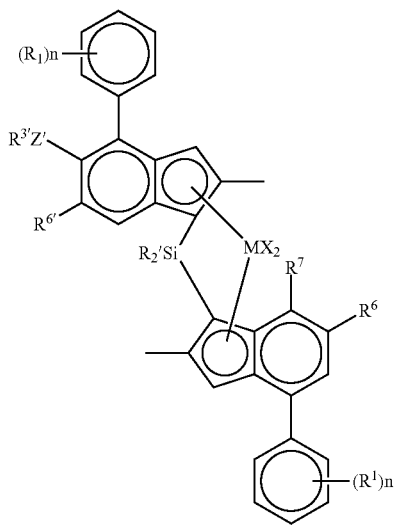

(VI')

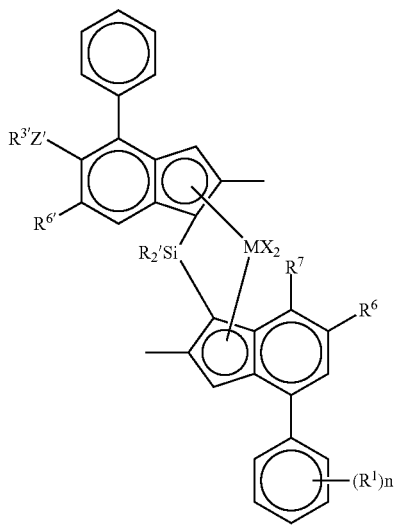

(VI)

M is zirconium or hafnium;

each X is a sigma ligand, preferably each X is independently a hydrogen atom, a halogen atom, C$_{1-6}$-alkoxy group, C$_{1-6}$-alkyl, phenyl or benzyl group;

each R' is independently a hydrogen atom, C$_{1-20}$ alkyl or C$_{3-7}$ cycloalkyl;

R$^6$ is hydrogen or a C$_{1-10}$ alkyl group;

R$^{6'}$ is a C$_{1-10}$ alkyl group or C$_{6-10}$ aryl group;

R$^7$ is hydrogen, C$_{1-6}$ alkyl or OC$_{1-6}$ alkyl;

Z' is O or S;

R$^{3'}$ is a C$_{1-10}$ alkyl group, or C$_{6-10}$ aryl group optionally substituted by one or more halo groups;

n is independently 0, 1 to 2; and each R$^1$ is independently a C$_{3-8}$ alkyl group.

Most especially, complexes of use in the invention are those of formula (VII') or (VII):

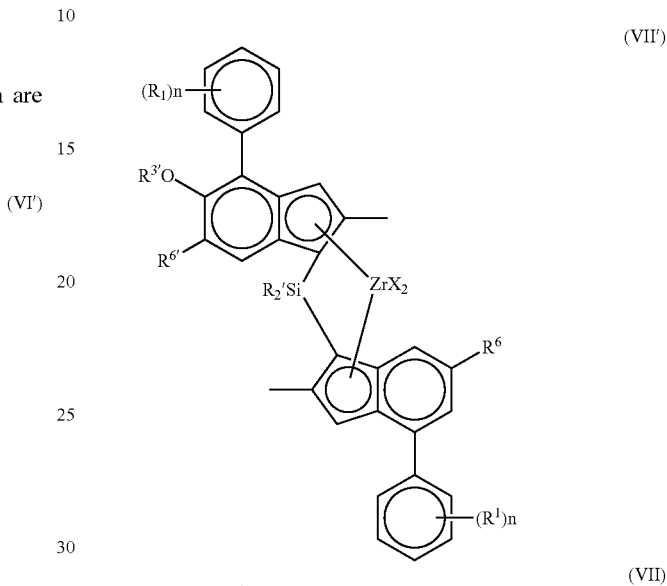

(VII')

(VII)

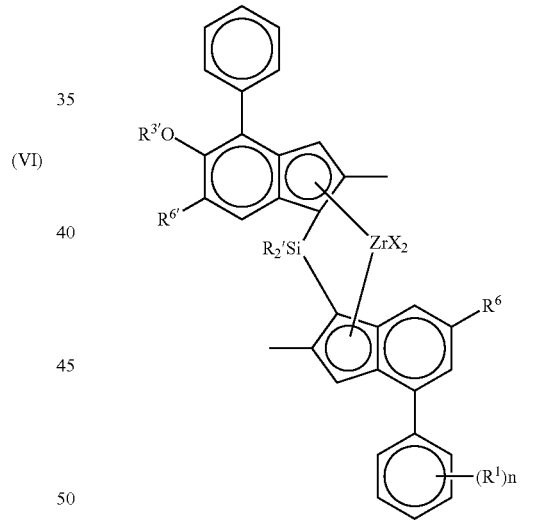

wherein each X is a sigma ligand, preferably each X is independently a hydrogen atom, a halogen atom, C$_{1-6}$-alkoxy group, C$_{1-6}$-alkyl, phenyl or benzyl group;

R' is independently a C$_{1-6}$ alkyl or C$_{3-10}$ cycloalkyl;

R$^1$ is independently C$_{3-8}$ alkyl;

R$^6$ is hydrogen or a C$_{3-8}$ alkyl group;

R$^{6'}$ is a C$_{3-8}$ alkyl group or C$_{6-10}$ aryl group;

R$^{3'}$ is a C$_{1-6}$ alkyl group, or C$_{6-10}$ aryl group optionally substituted by one or more halo groups; and n is independently 0, 1 or 2.

Particular compounds of the invention include:

rac-dimethylsilanediylbis[2-methyl-4-(4-tert-butylphenyl)-1,5,6,7-tetrahydro-s-indacen-1-yl] zirconium dichloride rac-dimethylsilanediylbis(2-methyl-4-phenyl-5-methoxy-6-tert-butylinden-1-yl) zirconium dichloride rac-anti-Me$_2$Si(2-Me-4-Ph-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OMe-6-tBu-Ind)ZrCl$_2$
rac-anti-Me$_2$Si(2-Me-4-(3,5-di-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OC$_6$F$_5$)-6-iPr-Ind)ZrCl$_2$
rac-anti-Me(CyHex)Si(2-Me-4-Ph-6-tBu-Ind)(2-Me-4-Ph-5-OMe-6-tBu-Ind)ZrCl$_2$
rac-anti-Me$_2$Si(2-Me-4-(3,5-di-tBuPh)-7-Me-Ind)(2-Me-4-Ph-5-OMe-6-tBu-Ind)ZrCl$_2$
rac-anti-Me$_2$Si(2-Me-4-(3,5-di-tBuPh)-7-OMe-Ind)(2-Me-4-Ph-5-OMe-6-tBu-Ind)ZrCl$_2$
rac-anti-Me$_2$Si(2-Me-4-(p-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-(4-tBuPh)-5-OMe-6-tBu-Ind)ZrCl$_2$
rac-anti-Me$_2$Si(2-Me-4-(p-tBuPh)-Ind)(2-Me-4-(3,5-tBu2Ph)-5-OMe-6-tBu-Ind)ZrCl$_2$
rac-anti-Me$_2$Si(2-Me-4-(p-tBuPh)-Ind)(2-Me-4-Ph-5-OiBu-6-tBu-Ind)ZrCl$_2$ For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application. These catalysts can be made following the principles in WO2013/007650.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in W0200202576, WO2011/135004, WO2012/084961, WO2012/001052, WO2011/076780 and especially WO2013/007650.

Cocatalyst

To form an active catalytic species it is normally necessary to employ a cocatalyst as is well known in the art. The present invention requires the use of both an aluminoxane cocatalyst and a boron containing cocatalyst.

The aluminoxane cocatalyst can be one of formula:

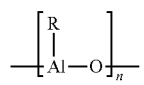 (I)

where n is usually from 6 to 20 and R has the meaning below.

Aluminoxanes are formed on partial hydrolysis of organoaluminum compounds, for example those of the formula AlR$_3$, AlR$_2$Y and Al$_2$R$_3$Y$_3$ where R can be, for example, C1-C10 alkyl, preferably C1-C5 alkyl, or C3-10-cycloalkyl, C7-C12-aralkyl or alkaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (I).

The preferred aluminoxane in the process according to the invention is methylaluminoxane (MAO). Since the aluminoxanes used according to the invention as cocatalysts are not, owing to their mode of preparation, pure compounds, the molarity of aluminoxane solutions hereinafter is based on their aluminium content.

It has been surprisingly found however, that in the context of heterogeneous catalysis, where catalysts are not supported on any external carrier or supported as described above, that higher activities can be achieved if a boron based cocatalyst is also employed as a cocatalyst. It is known in the art that where boron based cocatalysts are employed, and if the complex is not already alkylated at the metal, the complex needs to be alkylated by reaction with an aluminium alkyl compound. This procedure is well known and any suitable aluminium alkyl, e.g. Al(C$_{1-6}$-alkyl)$_3$ can be used.

The present invention combines the use of boron based cocatalysts with aluminoxanes rather than the combination of these simple aluminium alkyls and boron cocatalysts.

Boron based cocatalysts of interest include boron compounds containing a borate 3$^+$ ion, i.e. borate compounds. These compounds generally contain an anion of formula:

$$(Z)_4B^-$$ (V)

where Z is an optionally substituted phenyl derivative, said substituent being a C$_{1-6}$ alkyl group, haloC$_{1-6}$-alkyl or halo group. Preferred options are methyl, fluoro or trifluoromethyl. Most preferably, the phenyl group is perfluorinated or unsubstituted.

Such ionic cocatalysts preferably contain a non-coordinating anion such as tetrakis(pentafluorophenyl)borate and tetraphenylborate.

Suitable counterions are protonated amine or aniline derivatives or phosphonium ions. These may have the general formula (VI) or (VII):

$$NQ_4^+$$ (VI)

where Q is independently H, C$_{1-6}$-alkyl, C$_{3-8}$ cycloakyl, phenylC$_{1-6}$-alkylene- or optionally substituted Ph. Optional substituents may be C1-6-alkyl, halo or nitro. There may be one or more than one such substituent. Preferred substituted Ph groups include therefore para-substituted phenyl, preferably p-Br-phenyl or p-nitrophenyl, tolyl or dimethylphenyl.

It is preferred if at least one Q group is H, thus preferred compounds are those of formula:

$$NHQ_3^+$$ (VI')

or $$PHQ_3^+$$ (VII')

Preferred phenylC$_{1-6}$-alkyl- groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium A more preferred counterion is trityl (CPh$_3^+$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include: tributylammoniumtetra (pentafluorophenyl)borate, tributylammoniumtetra(trifluoromethylphenyl)borate, tributylammoniumtetra(4-fluorophenyl)borate, N,N-dimethylcyclohexylammoniumtetrakis (pentafluorophenyl)borate, N,N-dimethylbenzylammoniumtetrakis(pentafluorophenyl) borate, N,N-dimethylaniliniumtetrakis(pentafluorophenyl) borate, N,N-di(propyl)ammoniumtetrakis (pentafluorophenyl)borate, di(cyclohexyl) ammoniumtetrakis(pentafluorophenyl)borate, triphenylcarbeniumtetrakis(pentafluorophenyl)borate, ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate, (N,N-dimethylaniliniumtetrakis(pentafluorophenyl)borate).

It has been surprisingly found that certain boron based cocatalysts are especially preferred. Preferred borates of use in the invention therefore comprise the trityl ion. Thus the use of N,N-dimethylammonium-tetrakispentafluorophenyl-borate and $Ph_3CB(PhF_5)_4$ and analogues therefore are especially favoured.

Suitable amounts of cocatalyst will be well known to the skilled man.

The ratio of boron to the transition metal ion of the metallocene in the catalyst may be in the range 1:10 to 10:1 mol/mol, preferably 1:5 to 5:1, especially 1:5 to 2:1 mol/mol.

The ratio of Al in the aluminoxane to the metal ion of the metallocene may be in the range 1:1 to 1200:1 mol/mol, preferably 10:1 to 500:1, especially 100:1 to 300:1 mol/mol.

Catalyst Manufacture

The metallocene complex of the present invention is used in combination with the cocatalysts as a catalyst for the polymerization of olefins. The catalyst of the invention is in solid, preferably in unsupported form. Thus, no external carrier is used but the catalyst is still presented in solid particulate form. Thus, no external support material such as inert organic or inorganic carrier, such as for example silica is employed.

In order to provide the catalyst of the invention in solid form but without using an external carrier, it is preferred if a liquid/liquid emulsion system is used. The process involves forming dispersing catalyst components (i) (the complex) and (ii)+(iii) the cocatalysts) in a solvent, and solidifying said dispersed droplets to form solid particles.

In the present case, it is particularly preferred if the aluminoxane is contacted with the metallocene before the borate is added. Both cocatalyst components and the metallocene are preferably present in one solution.

In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles.

The catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalysts is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfiuorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr.6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$. —COOH, —$COONH_2$, oxides of alkenes, —CR"=$CH_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$. —COOH, —$COONH_2$, oxides of alkenes, —CR"=$CH_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e.g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C. are preferred.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component (s) within the droplets. The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e.g. as stated above, whereby said temperature change of the emulsion system is sufficient to cause the rapid solidification of the droplets. The receiving medium can be gaseous, e.g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e.g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerisation is relatively large.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

The droplet shape of the particles may be substantially maintained. The formed particles may have an average size range of 1 to 500 μm, e.g. 5 to 500 μm, advantageously 5 to 200 μm or 10 to 150 μm. Even an average size range of 5 to 60 μm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

The formed catalyst preferably has good stability/kinetics in terms of longevity of reaction, high activity and the catalysts enable low ash contents. Catalyst kinetics are also good. Catalysts should have at least a 30 minute period without any drop off in performance, preferably at least 1 h.

Catalyst Prepolymerisation (Off-Line Prepolymerisation)

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefin is propylene.

The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymerisation is continued until the prepolymerisation degree defined as weight of polymer/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimising leaching of catalyst components and thus local overheating.

After prepolymerisation, the catalyst can be isolated and stored.

Polymerisation

The present invention relates to a multistage polymerisation process using a single site catalyst, said process comprising an optional but preferred prepolymerisation step, a slurry step polymerisation, preferably a slurry bulk phase polymerisation step, and at least two gas phase polymerisation steps, ideally two gas phase steps only.

Preferably the same catalyst is used in each step and ideally, it is transferred from prepolymerisation to slurry and gas phase steps in sequence in a well known matter. One preferred process configuration is based on a Borstar® type cascade.

Prepolymerisation—Stage Ia

The process of the invention may utilise an in-line prepolymerisation step. This step is separate from the off-line prepolymerization of the catalyst using propylene discussed above. The catalyst off-line prepolymerization step is a part of the catalyst synthesis rather than a part of the propylene polymerisation process. The in-line prepolymerisation step takes place just before the slurry polymerisation step and may be effected in the presence of hydrogen although the concentration of hydrogen should be low if it is present. The concentration of hydrogen may be 0.01 mol % or less such as 0.01 to 0.001 mol % of the contents of the reactor. It is preferred if there is no hydrogen feed to the prepolymerisation reaction at all.

The temperature conditions within the prepolymerisation step are ideally kept low such as 0 to 50° C., preferably 5 to 40° C., more preferably 10 to 30° C.

The prepolymerisation stage preferably polymerises propylene monomer only. The residence time in the prepolymerisation reaction stage is short, typically 5 to 30 min.

The prepolymerisation stage preferably generates less than 5 wt % of the total polymer formed, such as 3 wt % or less.

Prepolymerisation preferably takes place in its own dedicated reactor, ideally in slurry. The prepolymerised catalyst is then transferred over to the slurry phase step. However, it is also possible, especially in batch processes, that prepolymerisation is carried out in the same reactor as actual first polymerisation preceeding said first polymerisation.

Slurry Polymerisation—Stage Ib

In the present invention the slurry polymerisation may produce a propylene homopolymer or a propylene copolymer with a C2-10 alpha olefin. The comonomer polymerised with the propylene may therefore be ethylene or a C4-10 alpha olefin or a mixture of comonomers might be used such as a mixture of ethylene and a C4-10 α-olefin.

As comonomers to propylene are preferably used ethylene, 1-butene, 1-hexene, 1-octene or any mixtures thereof, preferably ethylene. Such a copolymer made in the slurry phase polymerisation would generally have a low comonomer content such as up to 5 wt %, preferably up to 3 wt %.

It is preferred however if the slurry polymerisation step produces a homopolymer of propylene.

The slurry phase polymerisation is ideally effected in a loop reactor. Ideally, the polymerisation takes place in bulk, i.e. in a medium of liquid propylene. For slurry reactors in general and in particular for bulk reactors, the reaction temperature will generally be in the range 70 to 100° C., preferably 70 to 85° C. The reactor pressure will generally be in the range 5 to 80 bar (e.g. 20-60 bar), and the residence time will generally be in the range 0.1 to 5 hours (e.g. 0.3 to 2 hours).

It is preferred if hydrogen is used in the slurry polymerisation. The amount of hydrogen employed in the slurry phase is typically considerably greater than the amount used in the prepolymerisation stage.

Gas Phase Polymerisation Stages II and III

There are two gas phase steps in the process of the invention which we will call GPR1 and GPR2.

GPR1 may produce a propylene homopolymer or a propylene copolymer. If GPR1 produces a copolymer of propylene then that copolymer is preferably a random copolymer. Ideally, it will have a low amount of comonomer such as less than 10 wt % comonomer, ideally less than 5 wt % comonomer, ideally less than 3 wt % comonomer.

GPR1 preferably produces a propylene homopolymer. Where the process of the invention forms a heterophasic propylene copolymer, the product of the first gas phase step ideally forms part of the matrix component of the heterophasic copolymer.

GPR2 produces a copolymer, in particular heterophasic copolymer. Ideally that copolymer should have more than 10 wt % comonomer.

The comonomer polymerised with the propylene in any gas phase step may be ethylene or a C4-10 alpha olefin or a mixture of comonomers might be used such as a mixture of ethylene and a C4-10 α-olefin.

As comonomers to propylene are preferably used ethylene, 1-butene, 1-hexene, 1-octene or any mixtures thereof, preferably ethylene.

It is especially preferred if the propylene copolymer produced in GPR2 is a propylene ethylene copolymer. Where the process of the invention forms a heterophasic propylene copolymer, the product of the second gas phase step ideally forms part of the amorphous component of the heterophasic copolymer.

The propylene polymer formed in the process as whole is heterophasic propylene copolymer. Heterophasic copolymers may contain a propylene homopolymer or copolymer matrix (with generally a low comonomer content, e.g. 5 wt % or less, such as 3 wt % or less) and an amorphous propylene copolymer component. It is the amorphous component that is preferably formed in GPR2. It is preferred if the matrix component is made in slurry phase and also in the first gas phase step.

The ethylene content in the polymer as a whole may be up to 20 wt %, e.g. 0.5 to 15 wt %, depending on the desired properties of the polymer. The ethylene content of the propylene copolymer made in GPR2 may be 5 to 70 wt %. A most preferred process of the invention however involves a prepolymerisation step and then three further polymerisation steps, a slurry phase (preferably bulk phase) polymerisation and two gas phase polymerisations. The slurry and/or gas phase steps can take place in the same actual reactor (with conditions changed for each step) or in different reactors. Ideally of course, a series of reactors is used. In a most preferred embodiment there are separate reactors for each of the prepolymerisation, slurry and two gas phase steps.

For the first gas phase reactor in the process of the invention, the reaction temperature used will generally be in the range 60 to 90° C., preferably 70 to 85° C. The reactor pressure will generally be in the range 15 to 35 bar, preferably 20 to 33 bar.

For the second and further gas phase reactor in the process of the invention, the reaction temperature used will generally be in the range 60 to 80° C., preferably 65 to 75° C. The reactor pressure will generally be in the range 10 to 33 bar, preferably 18 to 30 bar.

The residence time within any gas phase reactor will generally be 0.5 to 8 hours (e.g. 0.5 to 4 hours). The gas used will be the monomer mixture optionally as mixture with a non-reactive gas such as nitrogen or propane.

The hydrogen content within the gas phase reactors is important for controlling polymer properties but is independent of the hydrogen added to prepolymerisation and slurry steps. Hydrogen left in the slurry step can be partially vented before a transfer to the gas phase is effected, but it can also be transferred together with the slurry into the gas phase reactor, where more hydrogen can be added to control the MFR to the desired value.

The first gas phase step may or may not contain hydrogen, ideally, hydrogen is present however. When the gas phase stage is used to produce an amorphous copolymer, then the reactor is preferably operated with a lower concentration of hydrogen compared to the slurry reactor. When this reactor is the fourth step of the polymerization reaction sequence, the amount of hydrogen used is largely independent from the amount of hydrogen used in steps I and II. In this case it can be operated also in the absence of hydrogen.

Preferably, the second gas phase polymerisation stage that takes place in the absence of hydrogen.

Thus, viewed from another aspect the invention provides a process for the preparation of a propylene copolymer in a multistage polymerisation process in the presence of a single site catalyst, said process comprising:

(Ia) prepolymerising a single site catalyst in the presence of propylene as sole monomer;

(Ib) in a slurry polymerisation stage, polymerising propylene only with the prepolymerised catalyst of step (Ia) and subsequently (II) in a first gas polymerisation stage polymerising propylene only in the presence of the catalyst and polymer from step (Ib); and subsequently (III) in a second gas polymerisation stage, polymerising propylene and at least one C2-10 alpha olefin comonomer in the presence of the catalyst and polymer from step (II);

wherein the catalyst is as hereinbefore defined.

The split ratios between reactors are important. In a typical known heterophasic copolymer production process, the bulk phase step produces a large excess of the overall polymer. In the present case, the ratios can be controlled over a broader range. The slurry phase may therefore produce 50 to 18 wt % of the overall polymer, preferably 45 to 20 wt %.

Generally the first gas phase polymerisation produces a higher quantity of polymer than a second gas phase stage but in our inventive process GPR2 can produce more polymer than GPR1. The split between GPR1 and GPR2 may be 30 to 70 or 70 to 30 wt %, preferably 40 to 60 to 60 to 40 wt %.

The split (by weight) between slurry polymer and gas phase polymer is ideally (slurry/GP1(+GP2)): 10:90 to 45:55, preferably 20:80 to 40:60. Note that any small amount of polymer formed in prepolymerisation is counted as part of the slurry polymer.

Considering all three steps, slurry may produce 20 to 45 wt %, GPR1 25 to 40 wt % and GPR2 30 to 45 wt %.

It is preferred if the activity in GP2 is at least 30%, preferably at least 40% of the activity of the bulk step.

Polymer Properties

The polymers made by the process of the invention may have an $MFR_2$ (melt flow rate measured according to ISO1133 at 230° C. with 2.16 kg load) of 2 to 100 g/10 min, such as 5 to 50 g/10 min, more preferably 6 to 30 g/10 min.

Matrix Phase/Component

The matrix component (also known as the matrix phase) is ideally a propylene homopolymer or propylene ethylene copolymer. The ethylene content in this component is preferably low, 2 wt % or less, ideally 1.5 wt % or less. Even more preferably there is less than 1 wt % ethylene in the matrix component. It is therefore preferred if the ethylene content of the xylene insoluble fraction of the polymers of the invention is 2 wt % or less, ideally 1.5 wt % or less. Even more preferably there is less than 1 wt % ethylene in the xylene insoluble fraction (C2(XI)<1 wt %).

Ideally of course, the matrix component is a homopolymer.

The $MFR_2$ of this matrix component may be in the range of 10 to 150 g/10 min, such 20 to 100 g/10 min, preferably 25 to 90 g/10 min.

Its intrinsic viscosity (IV) is ideally 1 to 4 dl/g.

It is preferred if the matrix phase is at least partially crystalline thus ensuring that the polymer as a whole comprises a crystalline phase and an amorphous phase.

EPR Phase/Component

The component made in GPR2 is preferably an ethylene propylene rubber (EPR). This component may have an excess of ethylene or an excess of propylene. There should preferably be no other comonomers present in the EPR phase.

It is thus preferred if the EPR fraction of the polymer as a whole is 25 to 50 wt %, such as 30 to 45 wt % of the polymer.

The ethylene content of the xylene soluble fraction, (C2(XS)) is between 18 and 70 wt %, preferably 20 to 67 wt %. In some embodiments therefore, there is an excess of ethylene in the EPR phase.

The $MFR_2$ of the xylene soluble component is preferably more than 0.01 g/10 min, preferably more than 0.05 g/10 min, more preferably more than 0.1 g/10 min, especially more than 0.2 g/10 min.

If the MFR values of a component cannot be measured directly, they can be calculated from intrinsic viscosity measurements based on the correlations defined in C. Grein, M. Gahleitner, B. Knogler & S. Nestelberger, *Melt viscosity effects in Ethylene-Propylene Copolymers*, Rheol.Acta, 46 (2007) 1083-1089. From the MFR of the total polymer and the MFR of the XS fraction (sometimes called the XCS fraction), the MFR of the matrix component of an impact copolymer can be calculated using a logarithmic mixing rule, i.e. using the following equation $$MFR(Total) = 10^{(1-w(EPR))log\ 10(MFR(Matrix)) + w(EPR)log\ 10(MFR(XCS))}$$

with w(EPR) being the weight fraction of the elastomeric phase, approximated by the weight fraction of the XS component.

Final Polymer Properties

The polymer of the invention is preferably a heterophasic ethylene/propylene copolymer. By heterophasic is meant that the polymer contains both a continuous semi-crystalline polymer phase (matrix) and an amorphous phase dispersed within the matrix.

The polymer as a whole preferably has a xylene soluble (XS) fraction of 20 to 60 wt %, such as 25 to 50 wt %.

It is also a preferred feature of the invention that that the intrinsic viscosity (IV) of the XS portion of the polymer as a whole is greater than the intrinsic viscosity (IV) of the xylene insoluble portion as a whole (IV(XI)).

Intrinsic viscosity is a measure of molecular weight and thus the XS portion of the polymer as a whole can be considered to have a higher Mw (weight average molecular weight) than that of the xylene insoluble portion.

Alternatively viewed, the intrinsic viscosity (IV) of the XS portion of the polymer as a whole is greater than the intrinsic viscosity (IV) of the matrix component.

The value of the IV of the XS phase divided by the IV of the xylene insoluble phase (XI) is preferably more than 1 to 5, such as IV(XS)/IV(XI) 1.1 to 4.

Alternatively viewed, the IV of the XS portion of the polymer as a whole/the IV of the matrix phase is 1 to 5, such as 1.1 to 4 dl/g.

The actual IV of the XS fraction may be in the range of 1 to 5 dl/g, such as 1 to 4 dl/g, preferably 1.5 to 3.5 dl/g.

Preferably, where the intrinsic viscosity of the xylene soluble fraction of said heterophasic propylene ethylene copolymer is greater than the intrinsic viscosity of the xylene insoluble fraction of said copolymer than the difference is at least 0.2 dl/g, such as at least 0.5 dl/g.

The IV of the polymer as a whole may be 0.9 to 3 dl/g, preferably in the range of 1.0 to 2.5 dl/g.

The tensile modulus of the heterophasic polymers of the invention may be at least 700 MPa, such as at least 800 MPa.

It is a feature of the invention that impact properties of the heterophasic polymer are excellent. The impact properties, as measured by charpy instrumented impact strength at 23° C. are preferably 35 $kJ/m^2$ or more, such as 40 $kJ/m^2$ or more. At −19° C. the values are 8 $kJ/m^2$ or more. Some remarkably high values of low temperature charpy are reported in our examples, such as 30 $kJ/m^2$ or more at −19° C.

The polymers of the invention have excellent brittle to ductile transition temperatures (BDTT) at a temperature of 10° C. or less, such as 5° C. or less, more preferably 0° C. or less, determined from Charpy instrumented impact strength according to ISO 179-2:2000.

Elongation at break values may be 300% or more, such as 320% or more.

The melting point Tm of the polymers of the invention may be 148° C. or more such as 148 to 155° C.

The xylene soluble fraction of the polymer of the invention may have an Mw of 80,000 to 250,000, such as 100,000 to 200,000. The XS fraction may have an Mw/M of 2 to 4.

Applications

The polymers of the invention are useful in the manufacture of a variety of end articles such as films (cast, blown or BOPP (bi-oriented PP) films), moulded articles (e.g. injection moulded, blow moulded, rotomoulded articles), extrusion coatings and so on. Preferably, polymers made by the process of the invention are used in packaging or automotive applications. Packaging of interest include heavy duty sacks, hygiene films, lamination films, and soft packaging films.

Due to their excellent low temperature impact properties, polymer compositions of the invention are ideal for use in food packaging or automotive parts.

The invention will now be illustrated by reference to the following non-limiting examples and figures. FIGS. 1 and 2 show GP2 activity as a function of C2(XS) for the examples of the invention and certain comparative examples. FIG. 3 shows the charpy impact for heterophasic materials prepared with the catalysts of the invention.

EXAMPLES

Measurement Methods

ICP analysis (for Al, B, P) The elemental analysis of a catalyst was performed by taking a solid sample of mass, m. The catalyst was deactivated by substituting the inert storing conditions with ambient air, first passively through a needle and the actively by applying vacuum three times to the sampling container. Samples were dissolved to a volume V by first cooling on dry ice while adding freshly deionised water (5% of V) and nitric acid ($HNO_3$, 65%, 5% of V). The samples were transferred in full to volumetric flasks using deionised water and rinsing the sampling containers. Hydrofluoric acid (HF, 40%, 3% of V) was added to the volumetric flasks and volume V obtained by addition of freshly deionised water. The prepared sample solutions were left to stabilise for two hours.

The analysis was run at room temperature using a Thermo Elemental iCAP 6300 Inductively Coupled Plasma—Optical Emission Spectrometer (ICP-OES) which was calibrated using a blank (a solution of 5% HNO3, 5 HF in deionised water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of B and P in solutions of 5% HNO3, 3% HF in deionised water.

Immediately before analysis the calibration is 'resloped' using the blank and 100 ppm Al, 50 ppm B, P standard, a quality control sample (20 ppm Al, 5 ppm B, P in a solution of 5% HNO3, 3% HF in DI water) is run to confirm the reslope. The QC sample is also run after every 5th sample and at the end of a scheduled analysis set.

The content of boron was monitored using the 249.773 nm line and the content of phosphorus using 177.495 nm and 178.284 nm lines. The content of aluminium was monitored via the 167.079 nm line, when Al concentration in ICP sample was between 0-10 ppm (calibrated only to 100 ppm) and via the 396.152 nm line for Al concentrations above 10 ppm.

The content of hafnium was monitored using the 282.022 nm and 339.980 nm lines and the content for zirconium using 339.198 nm line.

The reported values are an average of three successive aliquots taken from the same sample and are related back to the original catalyst by inputting the original mass of sample, m, and the dilution volume, V, into the software.

DSC Analysis

The melting point ($T_m$) and crystallization temperature ($T_c$) were determined on a DSC200 TA instrument, by placing a 5-7 mg polymer sample, into a closed DSC aluminium pan, heating the sample from −10° C. to 210° C. at 10° C./min, holding for 5 min at 210° C., cooling from 210° C. to −10° C., holding for 5 min at −10° C., heating from −10° C. to 210° C. at 10° C./min. The reported $T_m$ is the maximum of the curve from the second heating scan and $T_c$ is the maximum of the curve of the cooling scan.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg (MFR2) or 21.6 kg (MFR21).

The MFR of the XS fraction can also be calculated from the intrinsic viscosity (IV) of said fraction using the correlations defined in C. Grein, M. Gahleitner, B. Knogler & S. Nestelberger, Melt viscosity effects in Ethylene-Propylene Copolymers, Rheol.Acta, 46 (2007) 1083-1089. From the MFR of the total polymer and the MFR of the XS fraction, the MFR of the matrix component of an impact copolymer can be calculated using a logarithmic mixing rule, i.e. assuming the validity of the following equation:

$$MFR(Total)=10^{(1-w(EPR))log\ 10(MFR(Matrix))+w(EPR)log\ 10(MFR(XCS))}$$

with w(EPR) being the weight fraction of the elastomeric phase, approximated by the weight fraction of the XS.

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GM-HXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Prepolymerisation degree (DP): weight of polymer/weight of solid catalyst before prepolymerisation step Charpy Notched Impact Strength Charpy impact strength was determined according to ISO 179-1eA:2000 on V-notched samples of 80×10×4 mm³ at 23° C. (Charpy impact strength (23° C.)) and −20° C. (Charpy impact strength (−20° C.)). A standard impact velocity of 2.9 m/s was used.

The test specimens having a dimension of 80×10×4 mm³ were cut from the central part of ISO multibar specimens prepared by injection moulding in line with ISO 1873-2.

Brittle-to-Ductile Transition Temperature

The determination of the brittle-to-ductile transition temperature (BDTT) is based on the a(cN) values as determined from Charpy instrumented impact strength according to ISO 179-2:2000 on V-notched specimen with a geometry of 80×10×4 mm3 as required in ISO 179-1eA.

The a(cN) values are determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

Tensile Modulus and Elongation at Break

Tensile properties were determined according to ISO 527-2 (cross head speed=50 mm/min; 23° C.) using injection moulded specimens as described in EN ISO 1873-2 (ISO-5A specimen, 4 mm thickness).

Ethylene Content (FTIR C2)

Ethylene content was measured with Fourier transform infrared spectroscopy (FTIR) calibrated to results obtained by 13C NMR spectroscopy using a method which accounts for regio-irregular propene insertion. When measuring the ethylene content in polypropylene, a thin film of the sample (thickness about 0.220 to 0.250 mm) was prepared by hotpressing at 230° C. (preheat 5 min., press 1 min., cooling (cold water) 5 min.) using a Graseby Specac press. The FTIR spectra of the sample was recorded immediately with Nicolet Protégé 460 spectrometer from 4000 to 400 cm-1, resolution 4 cm-1, scans 64. The area of absorption peak at 733 cm-1 (baseline from 700 cm-1 to 760 cm-1) and height of reference peak at 809 cm-1 (baseline from 780 cm-1 to 880 cm-1) were evaluated. The result was calculated using the following formula $$Etot = a \times A/R + b$$

where
A=area of absorption peak at 733 cm-1
R=height of reference peak at 809 cm-1
Etot=C2 content (wt.-%)
a, b are calibration constants determined by correlation of multiple calibration standards of know ethylene content as determined by 13C NMR spectroscopy to A/R.

The result was reported as an average of two measurements.

Determination of Xylene Soluble Fraction (XS):

The xylene soluble fraction (XS) as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS \% = (100 \times m1 \times v0)/(m0 \times v1),$$

wherein m0 designates the initial polymer amount (grams), m1 defines the weight of residue (grams), v0 defines the initial volume (milliliter) and v1 defines the volume of the analysed sample (milliliter).

Intrinsic viscosity is measured according to DIN ISO 1628/1 and /3, October 1999 (in Decalin at 135° C.). The intrinsic viscosity (IV) value increases with the molecular weight of a polymer.

Metallocene Synthesis:

Catalysts

The metallocenes MC1 (rac-anti-dimethylsilandiyl(2-methyl-4-phenyl-5-methoxy-6-tert-butyl-indenyl)(2-methyl-4-(4-tert-butylphenyl)indenyl)zirconium dichloride) and MC2 (rac-anti-dimethylsilandiyl(2-methyl-4-(4-tert-butylphenyl)-5-methoxy-6-tert-butyl-indenyl)(2-methyl-4-(4-tert-butyl-phenyl)indenyl)zirconium dichloride) have been synthesized as described in WO2013/007650.

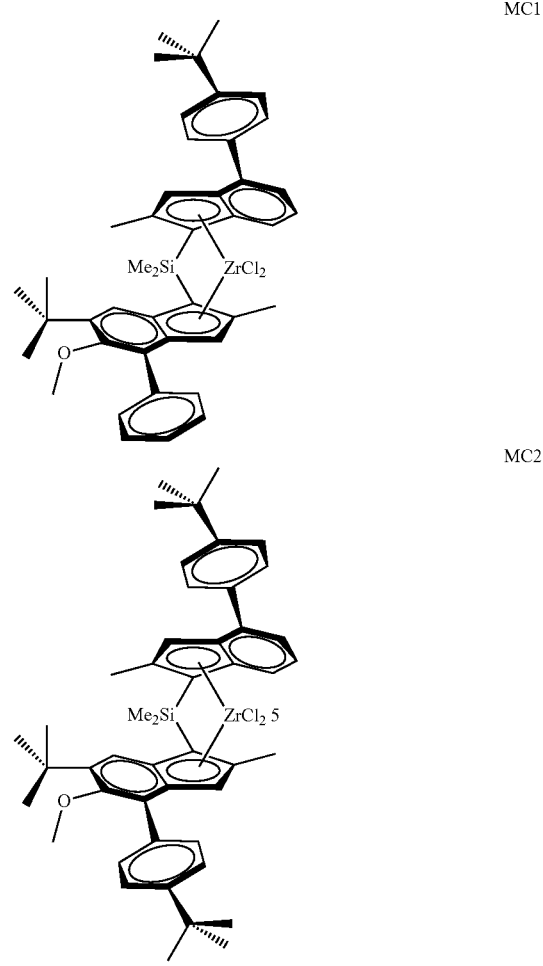

MC1

MC2

MAO Chemtura (30 wt % in toluene) or Albemarle (30 wt % in toluene) were used as received.

Surfactant: The mixture of perfluoroalkylethyl acrylate esters (CAS 65605-70-1) used as the surfactant was purchased from the Cytonix corporation or Wilshire Technologies, dried over activated molecular sieves (2 times) and degassed by argon bubbling prior to use.

Perfluoro-1,3-dimethylcyclohexane (PFC, CAS 335-27-3) was dried over activated molecular sieves (2 times) and degassed by argon bubbling prior to use.

Triphenylcarbeniumtetrakis(pentafluorophenyl)borate (short name trityl tetrakis (pentafluoro-phenyl)borate) (CAS 136040-19-2) was purchased from Acros and used as received.

Catalyst Synthesis: Comp Cat 1 and Comp Cat 2

Inside the glovebox, 80.0 µl of dry and degassed surfactant were mixed with 2 mL of MAO solution in a septum bottle and left to react overnight. The following day, 58.7 mg of MC1 (0,076 mmol) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow.

Comp cat 1: 0.60 g of a red solid catalyst was collected.
Comp cat 2: 0.81 g of a red solid catalyst was collected.

Catalyst 3 (of the Invention)

Inside the glovebox, 58.7 mg of metallocene MC1 (0.076 mmol) was mixed with 4 ml of MAO solution in a septum bottle and the solution was stirred for 60 minutes and then 129.1 mg of trityl tetrakis(pentafluorophenyl)borate was added. The mixture was left to react overnight at room temperature inside the glovebox. Then, in another septum bottle, 80 µl of dry and degassed surfactant was mixed with 2 mL of MAO. The solutions were left under stirring over night.

The following day, 4 mL of the MAO-metallocene-borate solution and 1 mL of the surfactant-MAO solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C. 600 rpm. Then the emulsion was transferred via a 2/4 teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.66 g (cat 3) of a red solid catalyst was obtained.

Comp. Catalyst 4

Inside the glovebox, 54 µL of dry and degassed surfactant were mixed with 2 mL of MAO solution in a septum bottle and left to react overnight. The following day, 44.50 mg of MC2 (0.051 mmol) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 1.0 g (cat 4) of a red solid catalyst was obtained.

Catalyst 5 (of the Invention)

Inside the glovebox, 44.50 mg of metallocene MC2 (0,051 mmol) was mixed with 4 ml of MAO solution in a septum bottle and the solution was stirred for 60 minutes and then 84.70 mg of trityl tetrakis(pentafluorophenyl)borate was added. The mixture was left to react overnight at room temperature inside the glovebox. Then, in another septum bottle, 80 µL of dry and degassed surfactant was mixed with 2 mL of MAO. The solutions were left under stirring over night.

The following day, 4 mL of the MAO-metallocene-borate solution and 1 mL of the surfactant-MAO solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.48 g (cat 4) of a red solid catalyst was obtained.

Prepolymerisation

Catalysts were pre-polymerised according to the following procedure: Off-line pre-polymerisation experiments were done in a 125 mL pressure reactor equipped with gas-feeding lines and an overhead stirrer. Dry and degassed perfluoro-1.3-dimethylcyclohexane (15 cm$^3$) and the desired amount of the catalyst (Table 1) to be pre-polymerised were loaded into the reactor inside a glove box and the reactor was sealed. The reactor was then taken out from the glove box and placed inside a water cooled bath kept at 25° C. The overhead stirrer and the feeding lines were then connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued for the polymerisation time (Table 1) sufficient to provide the desired degree of polymerisation (DP 2.5-4.0, Table 1). The reactor was then taken back inside the glove box before opening and the content was poured into a glass vessel. The perfluoro-1.3-dimethylcyclohexane was evaporated until a constant weight of the pre-polymerised catalyst (yield) was obtained. Tables 1a/b give catalyst properties.

TABLE 1A

| Catalyst name | Metallocene Complex | Al/Zr molar ratio | B/Zr molar ratio | MC content in prepolymerised catalyst (wt %) |
|---|---|---|---|---|
| Comp cat 1 | MC1 | 242 | | 1.24 |
| Comp cat 2 | MC1 | 250 | | 1.12 |
| Cat 3 | MC1 | 287 | 1.8 | 1.23 |
| Comp cat 4 | MC2 | 440 | | 0.65 |
| Cat 5 | MC2 | 401 | 1.8 | 0.78 |

TABLE 1B

| Catalyst | Prepol time/ min | Yield of prepolym. cat/g | Amount of non-prepolym cat/mg | Prepol degree (DP) g/g |
|---|---|---|---|---|
| Comp Cat 1 | 14 | 2.33 | 557 | 3.2 |
| Comp Cat 2 | 17 | 3.59 | 802 | 3.5 |
| Cat 3 | 18 | 2.14 | 593 | 2.6 |
| Comp Cat 4 | 18 | 2.90 | 605 | 3.8 |
| Cat 5 | 22 | 1.83 | 415 | 3.4 |

Polymerization examples: 3-Step Bulk Propylene Homopolymerization, Gas Phase Homopolymerisation, Gas Phase Copolymerisation Step 1: Bulk Propylene Homopolymerization A stirred autoclave (double helix stirrer) with a volume of 21.2 dm$^3$ containing 0.2 barg propylene, was filled with additional 3.97 kg propylene plus a certain amount of H2, if needed. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (type, amount and degree of polymerisation as listed in the tables) was loaded into a 5-mL stainless steel vial inside the glovebox, the vial was attached to the autoclave, then a second 5-mL vial containing 4 ml n-hexane and pressurized with 10 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internally reactor temperature reached 71° C., the chosen H2 amount was added with a defined flow via thermal mass flow controller. The reactor temperature was held constant throughout the polymerization. The polymerization time was measured starting when the temperature was 2° C. below the set polymerization temperature.

Step 2: Gas Phase Propylene Homopolymerization (GP1)

After the bulk step was finished, the stirrer speed was adjusted to 50 rpm and the reactor pressure was reduced to 0.5 bar below the set pressure by venting. Afterwards the stirrer speed was set to 250 rpm*, the reactor temperature to 80° C. and the chosen amount of H2 was dosed via thermal mass flow controller (MFC). Then the reactor P and T were held constant by propylene feed via MFC until the target split had been reached.

Step 3: Gas Phase ethylene/propylene copolymerization (GP2)

When the GP 1 had been finished, the stirrer speed was reduced to 50 rpm. The reactor pressure has reached 0.3 bar by venting, the temperature and control device was set to 70° C. Then the reactor was filled with 200 g propylene at a flow of 70 g/min and flushed again to 0.3 barg.

Afterwards the stirrer speed was adjusted to 250 rpm*. Then the reactor was filled with the chosen C3/C2 monomer ratio (transition feed). The C3/C2 ratio in the transition depends on the relative reactivity ratio of the two comonomers (R(C2/C3)), specific of each catalyst system. The speed of the reactor filling during the transition was limited by the max. flow of the gas flow controllers. When the reactor temperature reached 69° C. and the reactor pressure reached the set value, the composition of the fed C3/C2 mixture was changed to the target copolymer composition and temperature and pressure were held constant as long as a fixed amount of C3/C2 gas mixture had been consumed to reach the target rubber split. The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was stabilised with 0.2 wt % Ionol CP and 0.1 wt-% of Sandostab PEPQ (dissolved in acetone) and then dried overnight in a hood plus 2 hours in a vacuum drying oven at 60° C.

Results

The polymerization conditions are summarized in table 2.
The results of polymer analysis are listed in table 3 and 4.
The GP2 activity differences for Comp cat 1 and Cat 3 can be seen in FIG. 1 (GP2 pressure 20 bar-g) and FIG. 2 (GP2 pressure 25 bar-g).
The results of the physic-mechanical characterisation are listed in table 4, and the Charpy instrumented test curves are compared in FIG. 3. From these results one can see that not only the borate-modified catalyst is more active in gas phase, but it also gives heterophasic materials with improved impact properties.

TABLE 2

| CATALYST Example | Catalyst | PRE-POLY H2 in prepoly ML | BULK STEP, hPP, 80° C. | | | | GP1, hPP, 80° C. | | | | GP2 (C2/C3) at 70° C., no H2 | | | split bulk % | split GP1 % | split GP2 % |
|---|---|---|---|---|---|---|---|---|---|---|---|---|---|---|---|---|
| | | | total H2 in bulk step NL | residence time in bulk Min | Activity in bulk kgPP/ gcat/h | Activity bulk + GP1 kgPP/ gcat/h | P total av. barg | H2 in GP NL | residence time in GP1 min | Activity in GP1 kgPP/ gcat/h | P total (av) barg | residence time in GP2 min | Activity in GP2 kg/ gcat/h | | | |
| 1-C* | Comp cat 1 | 0 | 3.5 | 30 | 50.0 | 22.9 | 30 | 1.48 | 69 | 12.5 | 25 | 207 | 4.0 | 47 | 27 | 26 |
| 2-C | Comp cat 1 | 0 | 3.5 | 20 | 48.0 | 27.2 | 30 | 1.48 | 42 | 19.4 | 25 | 108 | 7.8 | 37 | 31 | 32 |
| 3-C | Comp cat 1 | 0 | 4.5 | 20 | 47.3 | 25.1 | 30 | 1.48 | 41 | 17.8 | 20 | 183 | 5.6 | 35 | 27 | 38 |
| 4-C | Comp cat 2 | 0 | 3.5 | 20 | 41.0 | 20.8 | 25 | 1.10 | 48 | 12.4 | 20 | 171 | 3.4 | 41 | 30 | 29 |
| 5-I** | Cat 3 | 0 | 3.5 | 30 | 32.8 | 28.3 | 30 | 1.48 | 42 | 26.3 | 25 | 74 | 15.6 | 30 | 34 | 36 |
| 6-I | Cat 3 | 0 | 3.5 | 30 | 25.1 | 30.8 | 30 | 1.48 | 42 | 30.1 | 25 | 80 | 15.6 | 23 | 39 | 38 |
| 7-I | Cat 3 | 0 | 3.5 | 30 | 34.7 | 30.9 | 30 | 1.48 | 42 | 29.3 | 25 | 74 | 14.0 | 31 | 37 | 31 |
| 8-I | Cat 3 | 0 | 3.5 | 30 | 23.2 | 28.5 | 30 | 1.48 | 44 | 29.6 | 25 | 100 | 15.6 | 20 | 37 | 44 |
| 9-I | Cat 3 | 0 | 3.5 | 30 | 23.8 | 22.8 | 25 | 1.10 | 46 | 22.1 | 20 | 52 | 18.5 | 27 | 38 | 36 |
| 10-I | Cat 3 | 0 | 3.5 | 30 | 23.8 | 20.8 | 25 | 1.10 | 45 | 18.8 | 20 | 57 | 15.9 | 29 | 34 | 37 |
| 11-C | Comp cat 4 | 0.1 | 3.0 | 20 | 61.1 | 18.3 | 25 | 1.10 | 108 | 10.4 | 20 | 151 | 3.5 | 43 | 39 | 18 |

TABLE 2-continued

| | | BULK STEP, hPP, 80° C. | | | | GP1, hPP, 80° C. | | | | GP2 (C2/C3) at 70° C., no H2 | | | | | |
|---|---|---|---|---|---|---|---|---|---|---|---|---|---|---|---|---|
| CATA-LYST Example | Catalyst | PRE-POLY H2 in prepoly ML | total H2 in bulk step NL | resi-dence time in bulk Min | Activ-ity in bulk kgPP/ gcat/h | Acti-vity bulk + GP1 kgPP/ gcat/h | P total av. barg | H2 in GP NL | resi-dence time in GP1 min | Activ-ity in GP1 kgPP/ gcat/h | P total (av) barg | resi-dence time in GP2 min | Activ-ity in GP2 kg/ gcat/h | split bulk % | split GP1 % | split GP2 % |
| 12-I | Cat 5 | 0.1 | 3.5 | 30 | 49.9 | 31.5 | 25 | 1.10 | 51 | 20.7 | 20 | 87 | 12.9 | 41 | 29 | 31 |
| 13-I | Cat 5 | 0.1 | 3.5 | 30 | 48.2 | 29.8 | 25 | 1.10 | 52 | 19.1 | 20 | 107 | 10.8 | 40 | 28 | 32 |

\*= Comparative example;
\*\*= Inventive example

TABLE 3

| Example | Catalyst | MFR Matrix (estimated) g/10 min | MFR2.16 whole g/10 min | bulk density g/ml | IV Matrix (calc.) dL/g | XS wt % | Tc ° C. | Tm ° C. | IV (XS) dL/g | IV(XS)/ IV (Matrix) | C2(XS) from IR(XS) wt % | Mn | Mw | PDI |
|---|---|---|---|---|---|---|---|---|---|---|---|---|---|---|
| 1-C | Comp cat 1 | | 19.5 | 0.38 | | 29.3 | 112.9 | 148.6 | 1.99 | | 21.8 | 86000 | 207000 | 2.4 |
| 2-C | Comp cat 1 | 35 | 5.7 | 0.39 | 1.37 | 35.5 | 112.5 | 148.7 | 2.65 | 1.93 | 65.1 | 100000 | 240000 | 2.4 |
| 3-C | Comp cat 1 | 35 | 18.4 | 0.36 | 1.37 | 43.4 | 112.9 | 148.2 | 1.69 | 1.23 | 29.2 | 70000 | 165000 | 2.4 |
| 4-C | Comp cat 2 | | 19.6 | 0.32 | | 27.7 | 113.3 | 147.9 | 1.79 | | 21.6 | 82000 | 191000 | 2.3 |
| 5-I | Cat 3 | | 17.3 | 0.32 | | 37.2 | 115.0 | 153.9 | 1.64 | | 21.3 | | | |
| 6-I | Cat 3 | | 16.4 | 0.33 | | 32.1 | 115.6 | 154.0 | 1.46 | | 30.9 | | | |
| 7-I | Cat 3 | 35 | 8 | 0.31 | 1.37 | 32.5 | 116.3 | 153.8 | 2.11 | 1.54 | 65.9 | 76000 | 194000 | 2.6 |
| 8-I | Cat 3 | 35 | 14.3 | 0.35 | 1.37 | 40.8 | 115.0 | 152.8 | 1.58 | 1.15 | 33.6 | 63000 | 153000 | 2.4 |
| 9-I | Cat 3 | | 24.7 | 0.35 | | 38.4 | 114.1 | 151.8 | 1.30 | | 22.5 | 54000 | 119000 | 2.2 |
| 10-I | Cat 3 | | 32.3 | 0.37 | | 36.3 | 114.3 | 152.1 | 1.20 | | 33.4 | 47000 | 105000 | 2.2 |
| 11-C | Comp cat 4 | | 18.5 | 0.39 | | 22.8 | 111.6 | 150.2 | 2.14 | | 23.8 | | | |
| 12-I | Cat 5 | | 18.7 | 0.42 | | 31.7 | 112.2 | 151.8 | 1.79 | | 20.6 | 77000 | 173000 | 2.2 |
| 13-I | Cat 5 | | 19 | 0.41 | | 34.5 | 113.9 | 152.8 | 1.69 | | 40.4 | 67000 | 147000 | 2.2 |

TABLE 4

| Experiment No. | Catalyst | BDT $T_{flex}$ ° C. | $a_{cN}$ −19° C. kJ/m2@1.5 m/s | $a_{cN}$ 23° C. kJ/m2@1.5 m/s | Tensile Modulus Mpa | Elogation at break % |
|---|---|---|---|---|---|---|
| 2-C | Comp cat 1 | 5 | 9.7 | 48.9 | 963 | 234 |
| 3-C | Comp cat 1 | −7 | 10.5 | 46.0 | 946 | |
| 7-I | Cat 3 | −1 | 9.5 | 52.9 | 1049 | 384 |
| 8-I | Cat 3 | −31 | 48.3 | 51.6 | 847 | 341 |

The invention claimed is:

1. A process for the preparation of a propylene copolymer in a multistage polymerisation process in the presence of a single site catalyst, said process comprising:
   (I) in a slurry polymerisation step, polymerising propylene and optionally at least one C2-10 alpha olefin comonomer in the presence of a single site catalyst; and subsequently
   (II) in a gas polymerisation step polymerising propylene and optionally at least one C2-10 alpha olefin comonomer, in the presence of the catalyst and polymer from step (I);
   (III) in a second gas polymerisation step, polymerising propylene and at least one C2-10 alpha olefin comonomer in the presence of the catalyst and polymer from step (II);
   wherein said catalyst comprises
   (i) a metallocene complex of a group (IV) metal, said metallocene comprising at least two cyclopentadienyl type ligands;
   (ii) a boron based cocatalyst; and
   (iii) an aluminoxane cocatalyst;
   said catalyst being in solid form, and being free from an external carrier.

2. A process for the preparation of a propylene copolymer in a multistage polymerisation process in the presence of a single site catalyst, said process comprising:
   (Ia) prepolymerising a single site catalyst in the presence of propylene;
   (Ib) in a slurry polymerisation step, polymerising propylene and optionally at least one C2-10 alpha olefin comonomer with the prepolymerised catalyst of step (Ia); and subsequently
   (II) in a gas polymerisation step polymerising propylene and optionally at least one C2-10 alpha olefin comonomer in the presence of catalyst and polymer from step (Ib);
   (III) in a second gas polymerisation step, polymerising propylene and at least one C2-10 alpha olefin comonomer in the presence of the catalyst and polymer from step (II);
   wherein said catalyst comprises
   (i) a metallocene complex of a group (IV) metal, said metallocene comprising at least two cyclopentadienyl type ligands;
   (ii) a boron based cocatalyst; and
   (iii) an aluminoxane cocatalyst;
   said catalyst being in solid form, and being free from an external carrier.

3. A process as claimed in claim 1 wherein the gas phase to slurry phase split is at least 50:50 wt %.

4. A process as claimed in claim 1 wherein the boron based cocatalyst is a borate cocatalyst.

5. A process as claimed in claim 1 wherein the solid catalyst is obtainable by a process in which
   (a) a liquid/liquid emulsion system is formed, said liquid/liquid emulsion system comprising a solution of the catalyst components (i) to (iii) dispersed in a solvent so as to form dispersed droplets; and
   (b) solid particles are formed by solidifying said dispersed droplets.

6. A process as claimed in claim 5 wherein the solid catalyst is obtained using a catalyst prepolymerisation step (c) wherein the solid catalyst from step (b) is prepolymerised with at least one alpha-olefin monomer and optionally one or more $C_3$-$C_{10}$ alpha-olefin comonomers.

7. A process as claimed in claim 6 wherein catalyst prepolymerisation is effected sing propylene.

8. A process as claimed in claim 1 wherein step (I) is a slurry bulk step.

9. A process as claimed in claim 1 wherein the ratio of boron to the transition metal ion of the metallocene in the catalyst is be in the range 1:10 to 10:1 (mol/mol).

10. A process as claimed in claim 1 wherein the ratio of Al in the aluminoxane to the transition metal ion of the metallocene is in the range 1:1 to 1200:1 mol/mol.

11. A process as claimed in claim 1 wherein the polymerisation temperature in step (I) is above 70° C.

12. A process as claimed in claim 1 wherein the complex is of formula (II):

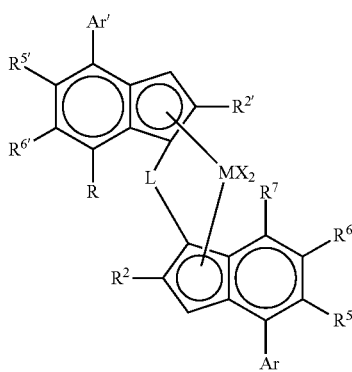

(II)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^5$ and $R^{5'}$ are each independently hydrogen, or a $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16; or
$R^5$ and $R^6$ taken together can form a 5 or 6 membered saturated or unsaturated carbon ring fused to the 6-membered ring of the indenyl group; or
$R^{5'}$ and $R^{6'}$ taken together can form a 5 or 6 membered saturated or unsaturated carbon ring fused to the 6-membered ring of the indenyl group;

$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and
each $R^4$ is a $C_{1-20}$ hydrocarbyl group.

13. A process as claimed in claim 1 wherein the complex is of formula (VII) or (VII'):

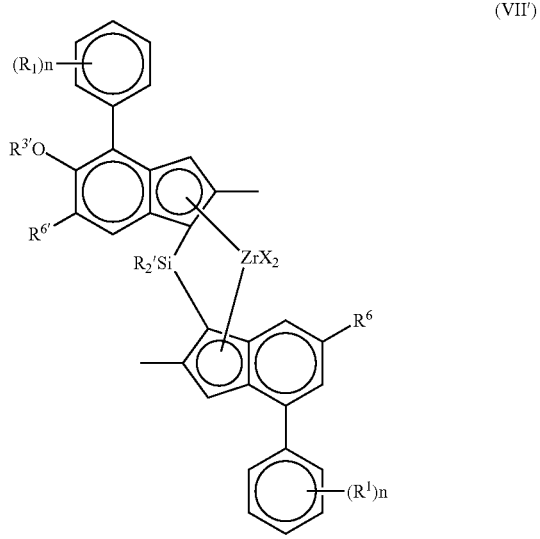

(VII')

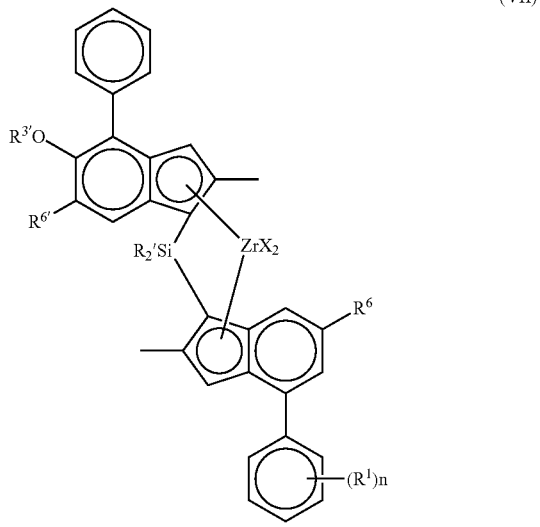

(VII)

wherein each X is a sigma ligand;
R' is independently a $C_{1-6}$ alkyl or $C_{3-10}$ cycloalkyl;
$R^1$ is independently $C_{3-8}$ alkyl;
$R^6$ is hydrogen or a $C_{3-8}$ alkyl group;
$R^{6'}$ is a $C_{3-8}$ alkyl group or $C_{6-10}$ aryl group;
$R^{3'}$ is a $C_{1-6}$ alkyl group, or $C_{6-10}$ aryl group optionally substituted by one or more halo groups; and
n is independently 0, 1 or 2.

14. A process as claimed in claim 1 wherein gas phase step (III) produces at least 30 wt % of the formed polymer.

15. A process as claimed in claim 1 wherein the propylene copolymer is a heterophasic propylene copolymer.

16. A process as claimed in claim 1 wherein said catalyst is in solid particulate form.

17. A process as claimed in claim 13 wherein in said metallocene, each X is independently a hydrogen atom, a halogen atom, $C_{1-6}$-alkoxy group, $C_{1-6}$-alkyl, phenyl or benzyl group.

18. A process as claimed in claim 3 wherein the gas phase to slurry phase split is at least 60:40wt %.

19. A process as claimed in claim 2 wherein the solid catalyst is obtainable by a process in which
   (a) a liquid/liquid emulsion system is formed, said liquid/liquid emulsion system comprising a solution of the catalyst components (i) to (iii) dispersed in a solvent so as to form dispersed droplets; and
   (b) solid particles are formed by solidifying said dispersed droplets.

20. A process as claimed in claim 19 wherein the solid catalyst is obtained using a catalyst prepolymerisation step (c) wherein the solid catalyst from step (b) is prepolymerised with at least one alpha-olefin monomer and optionally one or more $C_3$-$C_{10}$ alpha-olefin comonomers.

21. A process as claimed in claim 20 wherein catalyst prepolymerisation is effected using propylene.

22. A process as claimed in claim 2 wherein the complex is of formula (II):

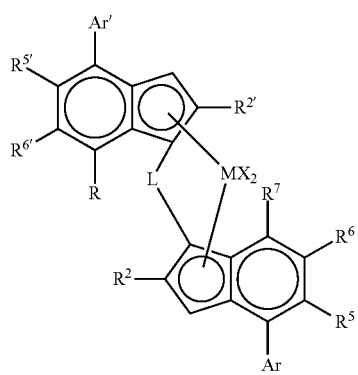

(II)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si —SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^5$ and $R^{5'}$ are each independently hydrogen, or a $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16; or $R^5$ and $R^6$ taken together can form a 5 or 6 membered saturated or unsaturated carbon ring fused to the 6-membered ring of the indenyl group; or
$R^{5'}$ and $R^{6'}$ taken together can form a 5 or 6 membered saturated or unsaturated carbon ring fused to the 6-membered ring of the indenyl group;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R_1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and
each $R^4$ is a $C_{1-20}$ hydrocarbyl group.

23. A process as claimed in claim 2 wherein the complex is of formula (VII) or (VII'):

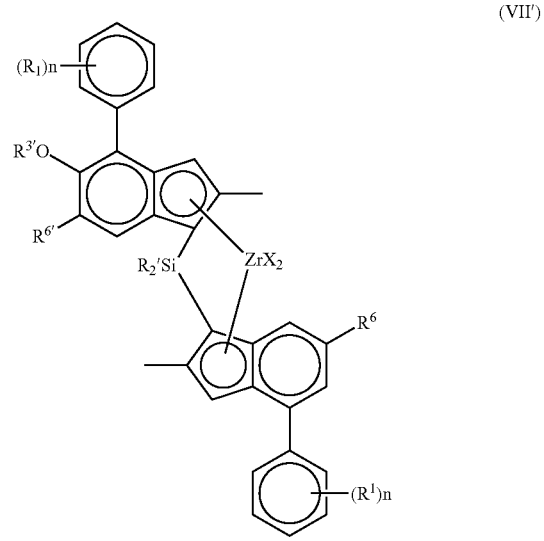

(VII')

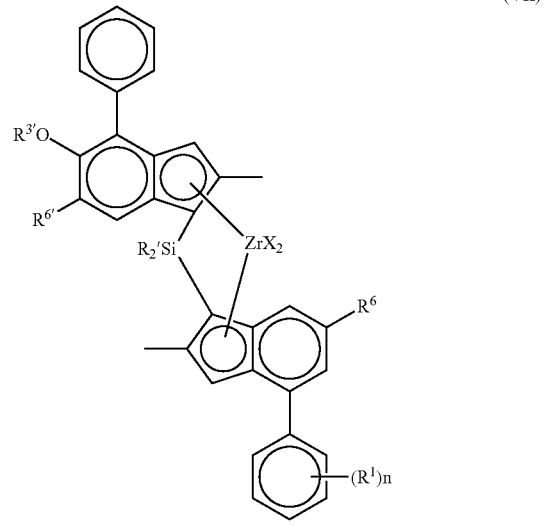

(VII)

wherein each X is a sigma ligand;
R' is independently a $C_{1-6}$ alkyl or $C_{3-10}$ cycloalkyl;
$R^1$ is independently $C_{3-8}$ alkyl;

$R^6$ is hydrogen or a $C_{3-8}$ alkyl group;
$R^{6'}$ is a $C_{3-8}$ alkyl group or $C_{6-10}$ aryl group;
$R^{3'}$ is a $C_{1-6}$ alkyl group, or $C_{6-10}$ aryl group optionally substituted by one or more halo groups; and
n is independently 0, 1 or 2.

24. A process as claimed in claim 2, wherein the propylene copolymer is a heterophasic propylene copolymer.

25. A process as claimed in claim 2, wherein said catalyst is in solid particulate form.

\* \* \* \* \*